(12) United States Patent
Yamaji

(10) Patent No.: US 9,844,829 B2
(45) Date of Patent: Dec. 19, 2017

(54) WELDING TORCH WITH UPPER AND LOWER SHIELDING GAS FLOW AND WELDING METHOD USING WELDING TORCH FOR HORIZONTAL WELDING

(71) Applicant: Yugo Yamaji, Nayoga (JP)

(72) Inventor: Yugo Yamaji, Nayoga (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 70 days.

(21) Appl. No.: 14/784,052

(22) PCT Filed: Apr. 9, 2014

(86) PCT No.: PCT/IB2014/000505
§ 371 (c)(1),
(2) Date: Oct. 13, 2015

(87) PCT Pub. No.: WO2014/170730
PCT Pub. Date: Oct. 23, 2014

(65) Prior Publication Data
US 2016/0052078 A1    Feb. 25, 2016

(30) Foreign Application Priority Data

Apr. 15, 2013 (JP) .................................. 2013-084756

(51) Int. Cl.
*B23K 9/02* (2006.01)
*B23K 9/29* (2006.01)
(Continued)

(52) U.S. Cl.
CPC ............ *B23K 9/291* (2013.01); *B23K 9/0206* (2013.01); *B23K 9/164* (2013.01); *B23K 9/167* (2013.01); *B23K 9/296* (2013.01)

(58) Field of Classification Search
CPC . B23K 9/167; B23K 9/16; B23K 9/32; B23K 9/291; B23K 9/0206; B23K 9/164; B23K 9/296
See application file for complete search history.

(56) References Cited

U.S. PATENT DOCUMENTS 4,843,210 A * 6/1989 Church ................ B23K 9/0209
219/126
5,968,375 A * 10/1999 Yoneda .................. B23K 9/167
219/75
2004/0188390 A1    9/2004 Satou et al.

FOREIGN PATENT DOCUMENTS

| JP | 62-254972 | 11/1987 |
| JP | 2000-84673 | 3/2000 |
| JP | 2007-38303 | 2/2007 |

OTHER PUBLICATIONS

Lu Shengchun, "A Training Course of Automobile Sheet Metal Repair", Chemical Industry Press, Jul. 2008, pp. 27-28.

* cited by examiner

*Primary Examiner* — Brian Jennison
(74) *Attorney, Agent, or Firm* — Finnegan, Henderson, Farabow, Garrett & Dunner, LLP

(57) ABSTRACT

A welding torch (1) includes a cylindrical nozzle (2) in which shielding gas is flown from an opening (3b), and an electrode (4) that is a bar-shaped body projecting from the opening (3b). The shielding gas includes upper shielding gas flowing in an upper region (3u) on an upper side of a central axis (C2) of the electrode (4), and lower shielding gas flowing in a lower region (3d) on a lower side of the central axis (C2) of the electrode (4). Atmospheric pressure of the lower shielding gas is higher than atmospheric pressure of the upper shielding gas. A method of horizontal welding with this kind of welding torch is also defined.

5 Claims, 4 Drawing Sheets

(51) Int. Cl.
*B23K 9/167* (2006.01)
*B23K 9/16* (2006.01)

WELDING TORCH WITH UPPER AND LOWER SHIELDING GAS FLOW AND WELDING METHOD USING WELDING TORCH FOR HORIZONTAL WELDING

BACKGROUND OF THE INVENTION

1. Field of the Invention

The invention relates to a welding torch and a welding method using the welding torch, and particularly to a welding torch for horizontal welding, in which shielding gas is flown and an electric arc is generated in shielding gas atmosphere, and a welding method using the welding torch.

2. Description of Related Art

There is a welding method for conducting arc welding, in which shielding gas is flown from an electrode to a portion to be welded, and an electric arc is generated between the electrode and a body to be welded.

For example, Japanese Patent Application Publication No. 2007-038303 A (JP 2007-038303 A) discloses a welding method, in which first shielding gas made of inert gas is flown towards a body to be welded so that the first shielding gas surrounds an electrode, and, simultaneously, second shielding gas containing oxidizing gas is flown towards the body to be welded on a peripheral side of the first shielding gas, thereby performing arc welding. According to the welding method, it is possible to deepen a weld metal portion without deteriorating welding quality, and carry out welding easily. Further, it is possible to improve welding efficiency.

Incidentally, there is horizontal welding, in which welding is performed along a surface inclined to a generally horizontal plane, or along a generally vertical plane. When horizontal welding is performed using the welding torch disclosed in JP 2007-038303 A, weld metal sags, and welding might not be carried out well.

SUMMARY OF THE INVENTION

The present invention provides a welding torch and a welding method for horizontal welding, by which welding is carried out well without causing sagging of weld metal even if the welding is carried out along a surface inclined to a generally horizontal plane, or along a generally vertical plane.

A welding torch according to an aspect of the present invention includes a cylindrical nozzle in which shielding gas is flown out from an opening, and an electrode that is a bar-shaped body projecting from the opening. The shielding gas includes upper shielding gas flowing in an upper region on an upper side of a central axis of the electrode, and lower shielding gas flowing in a lower region on a lower side of the central axis of the electrode, and atmospheric pressure of the lower shielding gas is higher than atmospheric pressure of the upper shielding gas.

According to this structure, a welding torch for horizontal welding is provided, by which sagging of weld metal is not caused, and welding is carried out well, even when the welding is carried out along a surface inclined to a generally horizontal plane or along a generally vertical plane.

The welding torch may be that the opening includes an upper side opening on the upper side of the central axis of the electrode, and a lower side opening on a lower side of the central axis of the electrode, and the upper side opening has a smaller sectional area compared to the lower side opening. The welding torch may also be that the electrode is positioned above a central axis of the nozzle, and is also parallel to the central axis of the nozzle.

Meanwhile, a welding method according to an aspect of the present invention is a welding method for carrying out arc welding by letting shielding gas flow from an opening, and generating an electric arc between an electrode and a body to be welded, by using a welding torch for horizontal welding. The welding torch includes a cylindrical nozzle in which the shielding gas is flown out from the opening, and the electrode that is a bar-shaped body projecting from the opening. The shielding gas includes upper shielding gas flowing in an upper region on an upper side of a central axis of the electrode, and lower shielding gas flowing in a lower region on a lower side of the central axis of the electrode, and the atmospheric pressure of the lower shielding gas is higher than atmospheric pressure of the upper shielding gas. Further, the opening may have an upper side opening on an upper side of the central axis of the electrode, and a lower side opening on a lower side of the central axis of the electrode, and the upper side opening may have a smaller sectional area compared to the lower side opening. The electrode may be positioned above the central axis of the nozzle, and may be also parallel to the central axis of the nozzle.

According to the aspects of the present invention, it is possible to provide a welding torch for horizontal welding, which realizes good welding without causing sagging of weld metal even when the welding is carried out along a surface inclined to a generally horizontal plane, or along a generally vertical plane.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

DETAILED DESCRIPTION OF EMBODIMENTS (First Embodiment) A welding torch according to a first embodiment will be explained by using FIG. 1A and FIG. 1B. FIG. 1A shows a sectional side view of a welding torch according to the first embodiment.

As shown in FIG. 1A, a welding torch 1 includes a body 2, a nozzle 3, and an electrode 4. The welding torch 1 is a welding torch for TIG welding (tungsten inert gas welding) in order to perform arc welding by letting shielding gas flow so as to surround the electrode 4, generating an electric arc between the electrode 4 and bodies to be welded, and shielding the electric arc from atmosphere.

Figure 1A:
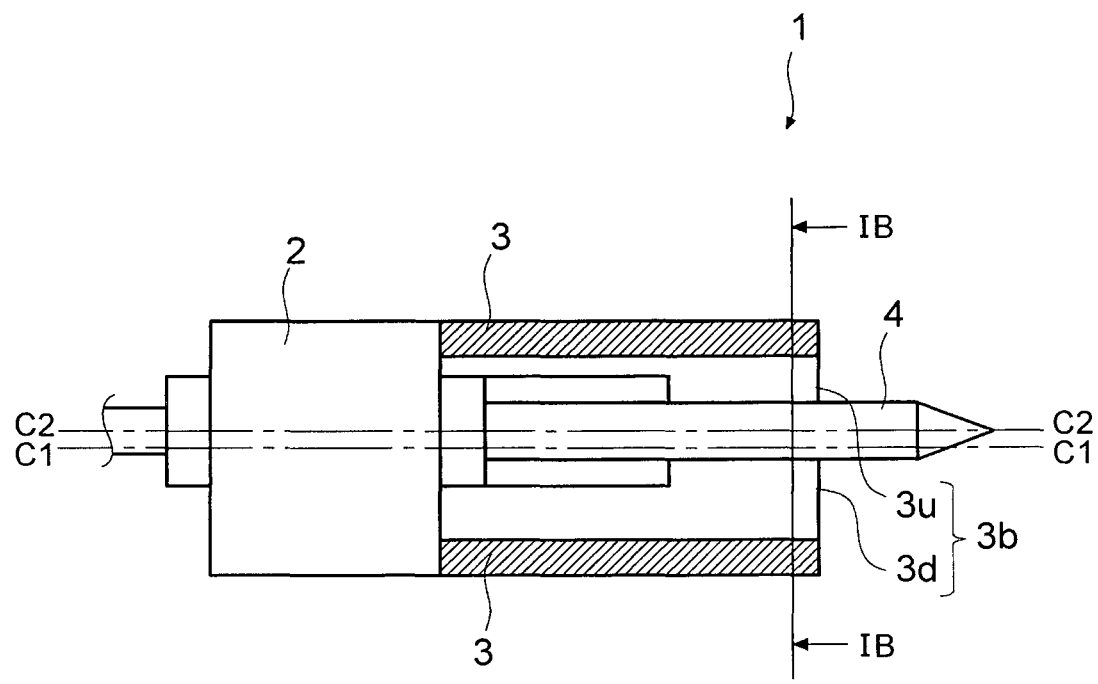
FIG. 1A is a sectional side view of a welding torch according to a first embodiment.

The body 2 is a support body that supports the nozzle 3 and the electrode 4. The body 2 may further include a mounting part so that the welding torch 1 is mounted on an industrial robot easily, and a gripping part for allowing a welding operator to grip the welding torch 1.

The nozzle 3 is a generally cylindrical body having a nozzle central axis C1. An end portion of the nozzle 3 is supported by the body 2. The nozzle 3 is connected with a welding device (not shown), and supplies shielding gas is supplied to the nozzle 3. It is possible to let the shielding gas flow from an opening 3b. As the shielding gas, for example, inert gas and mixed gas may be used. Examples of inert gas are argon gas, and helium gas. Examples of the mixed gas may be mixed gas of argon and oxygen, mixed gas of argon and carbon dioxide, and mixed gas of argon and hydrogen.

The electrode 4 is a bar-shaped body that is made of, for example, tungsten or tungsten alloy. The electrode 4 is inserted into an inner side of the nozzle 3, and is also supported by the body 2 along an electrode central axis C2. The electrode central axis C2 is located above the nozzle central axis C1, and is also parallel to the nozzle central axis C1. One end portion of the electrode 4 projects outwardly from the opening 3b of the nozzle 3. The electrode 4 is connected with the welding device (not shown).

Figure 1B:
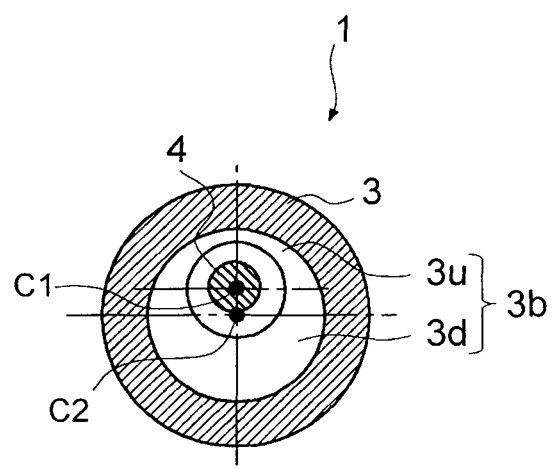
FIG. 1B is a sectional view of the welding torch according to the first embodiment.

As shown in FIG. 1B, in the opening 3b, an upper side of the electrode central axis C2 is referred to as an upper side opening 3u, and a lower side of the electrode central axis C2 is referred to as a lower side opening 3d. The upper side opening 3u has a smaller sectional area compared to the lower side opening 3d.

Figure 2A:
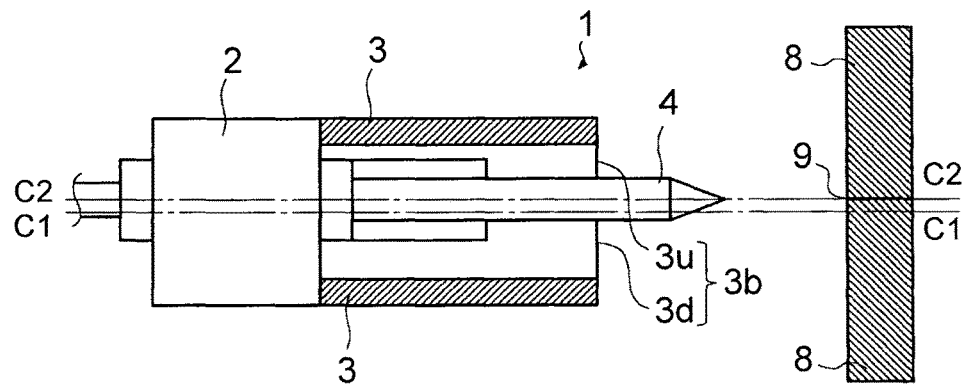
FIG. 2A is a schematic view illustrating a welding method illustrating the welding torch according to the first embodiment, and showing that the welding torch is arranged at a given position with respect to a body to be welded.
Figure 2B:
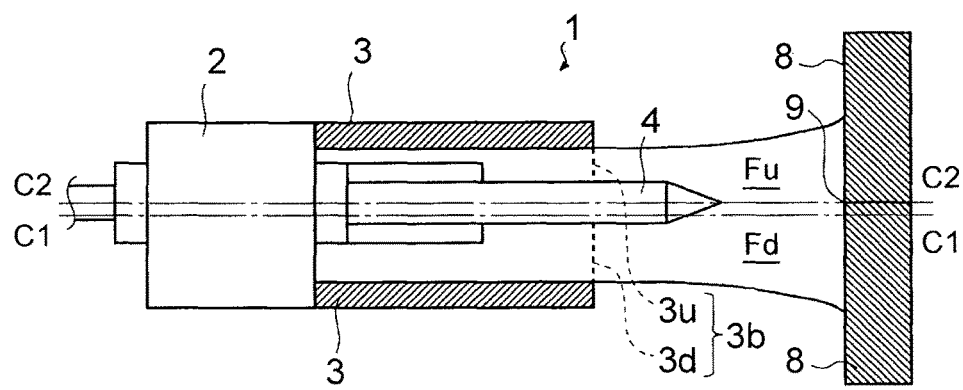
FIG. 2B is a schematic view illustrating the welding method using the welding torch according to the first embodiment, and showing that shielding gas is flown.
Figure 2C:
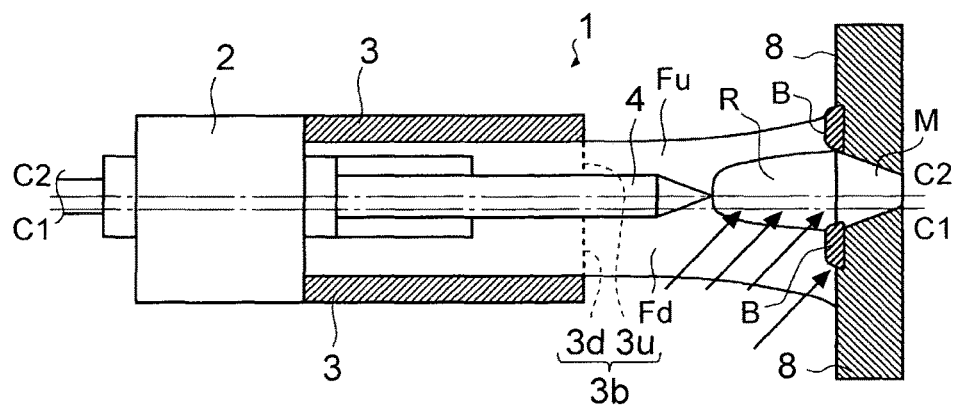
FIG. 2C is a schematic view illustrating the welding method using the welding torch according to the first embodiment, and showing that voltage is applied between an electrode and a portion to be welded for electric discharge, thereby generating an electric arc.

(Welding method) Next, a welding method using the welding torch according to the first embodiment will be explained by using FIG. 2A, FIG. 2B, and FIG. 2C. FIG. 2A, FIG. 2B, and FIG. 2C show schematic views illustrating a welding method using the welding torch according to the first embodiment. The explanation pertains to a case where bodies to be welded, positioned along a generally vertical plane, are welded.

As shown in FIG. 2A, the welding torch 1 is arranged at a given position with respect to the bodies to be welded 8. The bodies to be welded 8 are, for example, two plate-shaped bodies that are made of the same or different metallic materials. Examples of the metallic material used include iron, aluminum, magnesium, copper, titanium, zirconium, and nickel, or an alloy of iron, aluminum, magnesium, copper, titanium, zirconium, and nickel. The bodies to be welded 8 are set so as to face each other while main surfaces of the bodies to be welded 8 are positioned along a generally vertical plane. In the bodies to be welded 8, an area where the two bodies face each other is a portion to be welded 9.

Next, as shown in FIG. 2B, shielding gas is flown (shielding gas, inflow step S1). A flow rate of the shielding gas requires at least an amount of the shielding gas that is able to shield the portion to be welded 9 of the bodies to be welded 8, and the electric arc R (described later) from atmosphere. As stated above, the sectional area of the upper side opening 3u is smaller than a sectional area of the lower side opening 3d. The shielding gas includes upper shielding gas Fu on the upper side of the electrode central axis C2, and lower shielding gas Fd on the lower side of the electrode central axis C2. Thus, atmospheric pressure of the upper shielding gas Fu is smaller than atmospheric pressure of the lower shielding gas Fd. A difference in atmospheric pressure between the lower shielding gas Fd and the upper shielding gas Fu generates a force of the lower shielding gas Fd for pushing the portion to be welded 9 in the upward direction.

Finally, as shown in FIG. 2C, voltage is applied between the electrode 4 and the portion to be welded 9 to cause electric discharge, thereby generating the electric arc R (electric arc generation step S2). Heat of the electric arc R melts a part of the portion to be welded 9, and a molten pool M is thus formed. A part of the molten pool M is solidified as heat is removed by atmosphere and the bodies to be welded 8, thus forming a bead B. The molten pool M and the bead B are formed as weld metal.

The molten pool M and/or the bead B tries to sag down due to gravity, but the force generated by the difference in atmospheric pressure between the lower shielding gas Fd and the upper shielding gas Fu pushes upwardly and hold the molten pool M and/or the bead B. Therefore, sagging of the molten pool M and/or the bead B is prevented. Further, welding to other member, poor appearance, and cold lap are prevented, thus making it possible to perform good welding. Moreover, it is possible to omit prototyping for finding out welding conditions that realize good welding. Since it is possible to weld the bodies to be welded 8 as they are, without changing directions of the bodies to be welded 8, a holding jig for changing the directions of the bodies to be welded 8 is not required. Thus, facilities may be simplified, thus reducing facility investment, and, the welding torch 1 easily copes with various types of products.

In the usage stated above, the shielding gas inflow step S1, and the electric arc generation step S2 are carried out in this order, but the shielding gas inflow step S1 and the electric arc generation step S2 may be started and carried out simultaneously.

Figure 3A:
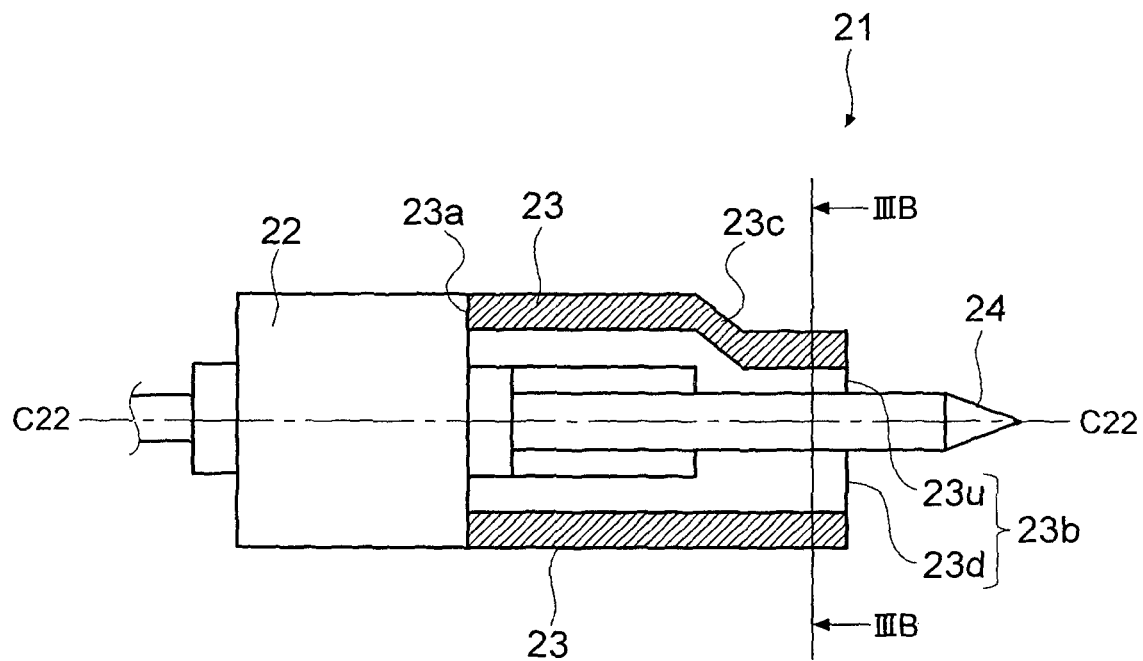
FIG. 3A is a sectional side view of a welding torch according to a second embodiment.
Figure 3B:
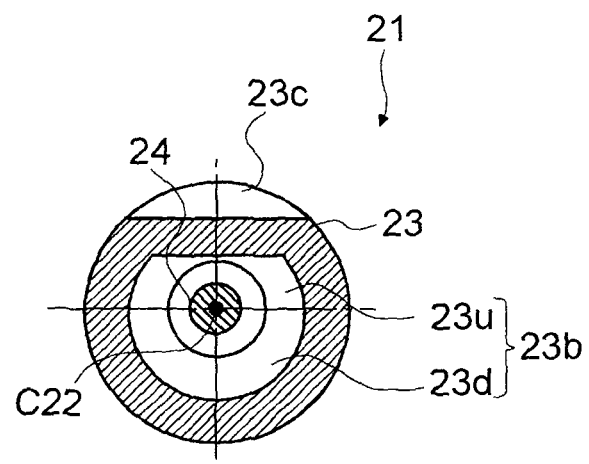
FIG. 3B is a sectional view of the welding torch according to the second embodiment.

(Second Embodiment) Next, a welding torch according to a second embodiment will be explained by using FIG. 3A and FIG. 3B. FIG. 3A shows a sectional side view of the welding torch according to the second embodiment. FIG. 3B is a sectional view of the welding torch according to the second embodiment. The welding torch according to the second embodiment is different from the welding torch 1 according to the first embodiment only in an electrode and a nozzle. Since the rest of the structure is common with the welding torch 1, the rest of the structure will thus be denoted by the same reference numerals, and explanation will be omitted.

As shown in FIG. 3A, a nozzle 23 is a cylindrical body that includes a supported part 23a supported by a body 22, and an opening 23b. The nozzle 23 has a narrowed part 23c in which a sectional area of the nozzle 23 on an upper side of an electrode central axis C22 of an electrode 24 is reduced from the supported part 23a towards the opening 23b. The opening 23b includes an upper side opening 23u and a lower side opening 23d. The upper side opening 23u has a smaller sectional area compared to the lower side opening 23d.

The electrode 24 is inserted in an inner side of the nozzle 23, and is supported by the body 22 along the electrode central axis C22. The electrode central axis C22 is an axis passing through a center point of the supported part 23a. One end portion of the electrode 24 projects outwardly from the opening 23b of the nozzle 23. The electrode 24 is connected with a welding device (not shown).

When bodies to be welded, which are positioned along a generally vertical plane, are welded by using the welding torch 21 according to the second embodiment, force generated by a difference in atmospheric pressure between lower shielding gas and upper shielding gas presses a molten pool and/or a bead upwardly, similarly to the case where the welding torch 1 according to the first embodiment is used. This prevents sagging of the molten pool M and/or the bead B. Also, cold lap is restrained, and incomplete fusion is prevented, thus realizing good welding. Moreover, it is possible to omit prototyping for finding out good welding conditions. Since it is possible to weld the bodies to be welded as they are, without changing directions of the bodies to be welded, a holding jig for changing the directions of the bodies to be welded is not required. Thus, the holding jig may be omitted, and facilities may be simplified, thus reducing facility investment. Also, the welding torch 21 easily copes with various types of products.

Figure 4A:
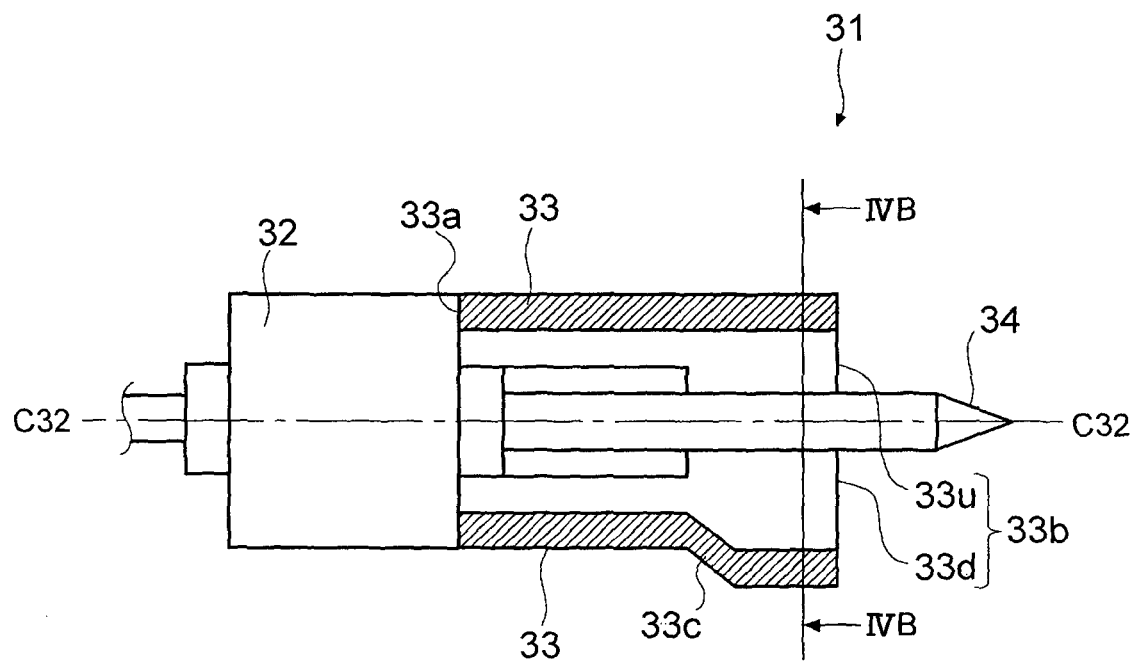
FIG. 4A is a sectional side view of a welding torch according to a third embodiment.
Figure 4B:
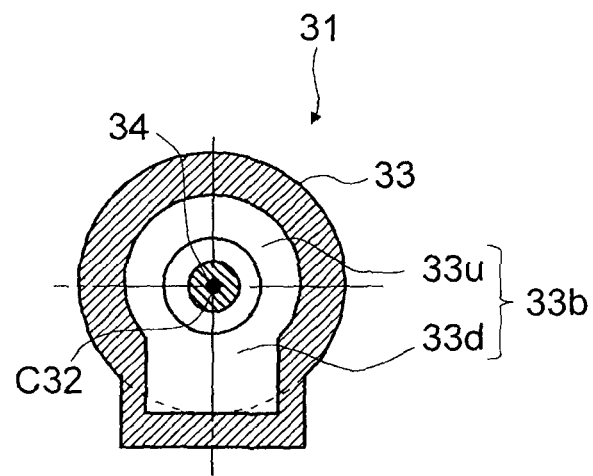
FIG. 4B is a sectional view of the welding torch according to the third embodiment.

(Third Embodiment) Next, a welding torch according to a third embodiment will be explained by using FIG. 4A and FIG. 4B. FIG. 4A is a sectional side view of the welding torch according to the third embodiment. FIG. 4B is a sectional view of the welding torch according to the third embodiment. The welding torch according to the third embodiment is different from the welding torch 1 according to the first embodiment only in an electrode and a nozzle. Since the rest of the structure is common with the welding torch 1, the rest of the structure is thus denoted by the same reference numerals, and explanation is omitted.

As shown in FIG. 4A, a nozzle 33 is a cylindrical body having a supported part 33a supported by a body 32, and an opening 33b. The nozzle 33 has an expanded part 33c in which a sectional area of the nozzle 33 on a lower side of an electrode central axis C32 of an electrode 34 is increased from the supported part 33a towards the opening 33b. The opening 33b has an upper side opening 33u and a lower side opening 33d. The upper side opening 33u has a smaller sectional area compared to the lower side opening 33d.

The electrode 34 is inserted into an inner side of the nozzle 33, and is supported by the body 32 along the electrode central axis C32. The electrode central axis C32 is an axis passing through a center point of the supported part 33a. One end portion of the electrode 34 projects outwardly from the opening 33b of the nozzle 33. The electrode 34 is connected with a welding device (not shown).

When bodies to be welded, which are positioned along a generally vertical plane, are welded by using the welding torch 31 according to the third embodiment, force generated by a difference in atmospheric pressure between lower shielding gas and upper shielding gas pushes a molten pool and/or a bead upwardly, similarly to the case where the welding torches 1, 21 according to the first and second embodiments are used. This prevents sagging of the molten pool and/or the bead. Also, cold lap is restrained, and incomplete fusion is prevented, thus realizing good welding. Moreover, it is possible to omit prototyping for finding out good welding conditions. Since it is possible to weld the bodies to be welded as they are, without changing directions of the bodies to be welded, a holding jig for changing the directions of the bodies to be welded is not required. Thus, the holding jig may be omitted, and facilities may be simplified, thus reducing facility investment. Also, the welding torch 31 easily copes with various types of products.

The present invention is not limited to the foregoing embodiments, and includes deformations, improvements, and so on within a scope where the object of the present invention is attainable.

In the foregoing embodiments, a difference in atmospheric pressure of the shielding gas was made by making the sectional area of the lower side opening of the nozzle larger than the sectional area of the upper side opening, but the difference in atmospheric pressure of the shielding gas may be made by using different methods. For example, two nozzles may be set on the upper side and the lower side of the electrode, respectively, and, the shielding gas is flown from the nozzle on the upper side at a higher speed than a speed of the shielding gas in the nozzle on the lower side, thus making a difference in atmospheric pressure of the shielding gas.

In the foregoing embodiments, the welding torch for carry out TIG welding was explained. However, a welding torch for carry out a welding method other than the TIG welding may be used, as long as the welding torch is for gas shield arc welding in which an electric arc is shielded from atmosphere by shielding gas. Welding methods for TIG welding include, for example, MAG welding (metal active gas welding), MIG welding (metal inert gas welding), and plasma welding. For welding methods other than TIG welding, materials for an electrode, shielding gas, bodies to be welded may be changed as necessary, or a necessary welding device may be added.

In the foregoing embodiments, the bodies to be welded, which are positioned along a generally vertical plane, are welded. Similarly, it is also possible to weld bodies to be welded, which are inclined to a horizontal plane. In other words, in any of the foregoing embodiments, horizontal welding is able to be carried out.

The invention claimed is:

1. A welding torch for horizontal welding, comprising:
a cylindrical nozzle, in which shielding gas is flown from an opening; and
an electrode, which is a bar-shaped body projecting from the opening, wherein
the cylindrical nozzle and the electrode are both oriented horizontally with respect to a gravitational direction during a welding operation,
the shielding gas has upper shielding gas flowing in an upper region on an upper side of a central axis of the electrode with respect to the gravitational direction, and lower shielding gas flowing in a lower region on a lower side of the central axis of the electrode with respect to the gravitational direction, and
atmospheric pressure of the lower shielding gas is higher than atmospheric pressure of the upper shielding gas thereby generating an upward force counteracting a sagging of weld metal during the horizontal welding, and
the central axis of the electrode is an axis that is located above a central axis of the nozzle, and is parallel to the central axis of the nozzle.

2. The welding torch for horizontal welding according to claim 1, wherein
the opening includes an upper side opening arranged on the upper side of the central axis of the electrode, and a lower side opening arranged on the lower side of the central axis of the electrode, and
a sectional area of the upper side opening is smaller than a sectional area of the lower side opening.

3. A welding method, comprising:
arranging a welding torch horizontally with respect to a gravitational direction;
flowing shielding gas from an opening of the welding torch; and generating an electric arc between an electrode of the welding torch and a body to be welded to perform arc welding while the welding torch is arranged horizontally with respect to the gravitational direction, wherein the welding torch includes a cylindrical nozzle in which the shielding gas is flown out from the opening, the electrode is a bar-shaped body projecting from the opening, the shielding gas has upper shielding gas flowing in an upper region on an upper side of a central axis of the electrode with respect to the gravitational direction, and a lower shielding gas flowing in a lower region on a lower side of the central axis of the electrode with respect to the gravitational direction, and atmospheric pressure of the lower shielding gas is higher than atmospheric pressure of the upper shielding gas thereby qeneratinq an upward force counteracting a sagging of weld metal during the arc welding.

4. The welding method according to claim 3, wherein the opening includes an upper side opening on the upper side of the central axis of the electrode, and a lower side opening on the lower side of the central axis of the electrode, and a sectional area of the upper side opening is smaller than a sectional area of the lower side opening.

5. The welding method according to claim 4, wherein the central axis of the electrode is an axis that is located above a central axis of the nozzle, and is parallel to the central axis of the nozzle.

\* \* \* \* \*